United States Patent Office 2,894,014
Patented July 7, 1959

2,894,014

COMPLEX ESTERS OF BETA-PHOSPHATO-ALPHA, BETA-OLEFINICALLY UNSATURATED MONO-CARBOXYLIC ACIDS

Alan R. Stiles and Richard R. Whetstone, Denver, Colo., assignors to Shell Development Company, New York, N.Y., a corporation of Delaware No Drawing. Application December 28, 1955
Serial No. 555,753

11 Claims. (Cl. 260—461)

This invention relates to a new class of phosphorus-containing compounds which have been found to be particularly useful as insecticides.

The compounds of the invention are esters of beta-phosphato-alpha,beta-olefinically unsaturated monocarboxylic acids represented by the formula

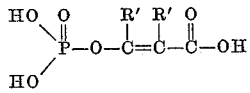

wherein $R'$ represents a hydrogen atom or a hydrocarbon radical, with an aliphatic alcohol which contains at least one other functional group containing oxygen. The esters of the invention thus include esters of the acid of the said structure wherein one, two, or all three of the acidic hydrogen atoms are replaced by the residue of the said aliphatic alcohol. Where less than all of the acidic hydrogen atoms are replaced by the residue of the said alcohol, it is preferred that the remaining acidic hydrogen atom or atoms be replaced by the residue of a hydrocarbyl alcohol, ROH, wherein R represents a hydrocarbyl group as set out hereinafter. The aliphatic alcohol containing an additional oxygen-containing functional group may be considered to have the formula: HO—$R^2$—$R^3$, wherein $R^2$ represents a divalent aliphatic hydrocarbon group and $R^3$ represents a functional group involving oxygen. Accordingly, the compounds of the invention may be generically represented by the formula:

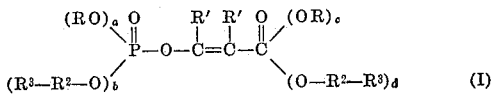

wherein R, $R'$, $R^2$ and $R^3$ have the meanings set out hereinbefore, $a$ is an integer of from 0 to 2, with the proviso that $a+b=2$, and $c$ is an integer from 0 to 1, with the proviso that $c+d=1$ and $b+d=$at least 1 and not more than 3.

In these compounds, it is preferred that $R'$ represent either a hydrogen atom or a hydrocarbon group containing from 1 to about 8 carbon atoms. $R'$ thus includes aliphatic—including cycloaliphatic—hydrocarbon groups, such as alkyl groups of either straight-chain or branched-chain configuration, cycloalkyl groups, and their unsaturated analogs, aryl groups, and combinations thereof, such as araliphatic groups and aryl groups substituted by one or more aliphatic groups, e.g., aralkyl and alkaryl groups. Preferably, such groups contain not more than about eight carbon atoms each, considering both ring and non-ring carbon atoms. It is preferred that $R'$ be an alkyl group, the lower alkyl groups, those containing 8 carbon atoms or less, each being the most desirable.

The symbol R represents the same hydrocarbon groups as are designated by the symbol $R'$.

The symbol $R^2$ represents a divalent aliphatic hydrocarbon radical, the linking valence bonds being on the same or on different carbon atoms. These groups may be of either straight-chain or branched-chain configuration. It is preferred that $R^2$ represent an alkylene group, and that the group contain not more than about ten carbon atoms.

The symbol $R^3$ represents "a functional group involving oxygen"—by which term is meant any reactive functional group which includes an oxygen atom. Examples of such groups include the hydroxyl group, —OH; the ether group —$OR^4$; the carboxy group, —C(O)OH, and ester groups, —C(O)$OR^4$, such as the carboalkoxy groups derived from glycolic acid, lactic acid, and like hydroxy-carboxylic acids, and the $R^4$ esters thereof; carbonyl groups, such as the aldehyde group, —C(O)H, and ketone groups, —C(O)$R^4$, including such groups as the acetyl group, the benzoyl group, the anisoyl group, caproyl group, and the like, olefinically unsaturated groups such as the acrylyl group, the crotonyl group, and the like, and such substituted groups as the alanyl group, the anthranoyl group, the benziloyl group, the oxamyl group, and the like; also included are such groups as the pivalyl group, the alkoxalyl group, the glycolyl group, the glyoxylyl group, and the like. $R^3$ aso represents such groups as the sulfonic acid group, —$SO_3H$, and esters thereof, —$SO_3R^4$; the nitro group, —$NO_2$; the nitroso group, —ONO; the carbamyl group, $H_2NC(O)$— and the $R^4$ derivatives thereof, and the like. Also included within the meaning of $R^3$ are hydrocarbon groups linked to the group $R^2$ through an oxygen-containing functional group and also such groups containing one or more additional oxygen-containing functional groups, such as the acyloxy groups, —O—C(O)$R^4$, the acetoxy group, the benzoyloxy group, the pivalyloxy group, and the like. More than one group $R^3$ may be substituted on the group $R^2$. It is preferred that the functional groups represented by $R^3$ be composed of atoms selected from the group consisting of carbon, hydrogen and oxygen atoms. In these functional groups, $R^4$ represents the groups defined by the symbol R. It is preferred that the groups designated by $R^3$ contain not more than about 10 carbon atoms each, including the carbon atoms contained in the groups designated as $R^4$.

The preferred compounds of the invention are the esters of aliphatic polyhydric alcohols, especially glycols, and derivatives thereof such as esters or ethers of such alcohols.

Examples of this new class of esters include:

2 - (2 - acetoxyethoxycarbonyl) - 1 - methylvinyl dimethyl phosphate,
2 - (2 - acetoxyethoxycarbonyl) - 1 - methylvinyl diethyl phosphate,
2 - (2 - methoxypropoxycarbonyl) - 1 - methylvinyl dimethyl phosphate,
2 - (2 - carboethoxyethoxycarbonyl) - 1 - methylvinyl dimethyl phosphate
2 - (2 - (benzoyloxy)ethoxycarbonyl) - 1 - methylvinyl dimethyl phosphate
Bis(2 - methoxyethyl) - 2 - (2 - methoxyethoxycarbonyl)-1-methylvinyl phosphate
2-carbethoxy-1-methylvinyl ethyl 2-methoxyethyl phosphate
2 - (3 - carbethoxypropoxycarbonyl) - 1,2 - dimethylvinyl dibutyl phosphate
2 - (2 - carbobutoxybutoxycarbonyl) - 1 - ethylvinyl dipentyl phosphate
2 - (2 - butoxybutoxycarbonyl) - 1 - phenylvinyl di - isopropyl phosphate
Bis(2-methoxyethyl) 2-carbethoxy-1-methylvinyl phosphate
2-methoxyethyl 2-carbomethoxy-1-methylvinyl methyl phosphate
Bis(2-acetoxyethyl) 2-carbethoxy-1-methylvinyl phosphate 2-acetoxyethyl 2-carbethoxy-1-methylvinyl methyl phosphate
2-(2-acetoxyethoxycarbonyl)-ethenyl dimethyl phosphate Within the generic class of compounds of this invention two subgenera are of particular utility as insecticides. Compounds of the general Formula I, in which $d=1$ and $a=2$, i.e., compounds of the formula

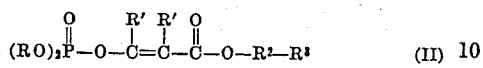
$$(RO)_2P-O-C=C-C-O-R^2-R^3 \quad \text{(II)}$$

in which each of the groups, R, R', R² and R³ contain six carbon atoms or less, have been found to be highly active insecticides with excellent residual activity. Compounds of the general Formula I, wherein $c=1$ and $b=1$ or 2, i.e., compounds of the formula

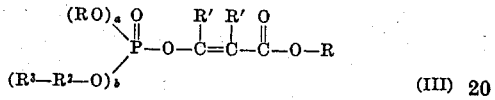
$$\begin{array}{c}(RO)_a \\ \phantom{XX}\diagdown \\ \phantom{XXX}P-O-C=C-C-O-R \\ \phantom{XX}\diagup \\ (R^3-R^2-O)_b\end{array} \quad \text{(III)}$$

wherein $a+b=2$ and $b=1$ or 2, have been found to be highly active against a number of common insect pests. These two subgenera therefore form the preferred aspects of the invention.

These new esters are conveniently prepared by (a) ester interchange between an alcohol or phenol having an oxygen-containing functional group (R³—R²—OH) or, in the case of compounds of the type represented by Formula III, a simple hydrocarbyl alcohol, (ROH), with an ester of a hydrocarbyl-substituted beta-oxo fatty acid, R'—C(O)—CHR'—C(O)—OR$^x$, according to the equation:

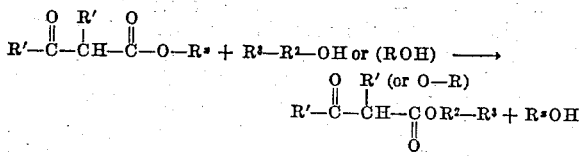

The hydrocarbyl substituted beta-oxo fatty acids are well known and are generally prepared according to the method described by Bader et al., Journal of the American Chemical Society, volume 73, pages 4195-7 (1951). This reference also sets out the method for conducting Reaction a.

(b) Reaction of the product of (a) with sulfuryl chloride to give the 2-chloro-substituted compound

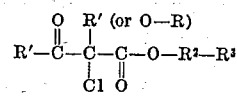

Reaction b is carried out according to the method described by Dey in Journal of the Chemical Society, volume 107 (1915), at page 1646 et seq., by McBeth in Journal of the Chemical Society, volume 123, page 1125 et seq. (1925), and by Allihn, Berichte der deutschen Chemischen Gesellschaft, volume 11, page 567 et seq. (1878).

(c) Reaction of the 2-chloro-substituted compound with a phosphite

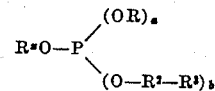

wherein $a+b=2$, and $a=0$, 1 or 2, to give the desired products. In the reactions set out above, R$^x$ normally is an alkyl group.

The phosphites ((RO)₃P, (R₃R₂O)₃P) are a well known class of compounds ordinarily prepared by reacting one mole of phosphorus trichloride with three moles of an alcohol (ROH, R₃R₂OH) in the presence of three moles of a basic hydrogen chloride acceptor such as pyridine or trimethylamine. The phosphites $(RO)_a(R_3R_2O)_bP$ are prepared in a similar manner by first reacting one mole of phosphorus trichloride with "$a$" moles of the alcohol ROH and "$a$" moles of the hydrogen chloride acceptor and then reacting the product with "$b$" moles of the alcohol R₃R₂OH with "$b$" moles of the hydrogen chloride acceptor. (Kosolapoff, "Organic-phosphorus Compounds," Wiley (1950), pages 184 and 185.)

Reaction c is carried out by adding about an equimolar amount of the phosphite to the chloroester, the addition usually being made slowly so as to avoid undue temperature increase of the reaction mixture from the exothermic heat of reaction. The reaction may be started with the reactants at an ordinary temperature of about 20 to 25° C., but for the most part is conducted at a temperature between about 60° C. and 150° C. In some cases, the starting of the reaction is assisted by application of heat, and especially if large quantities of reactants are used, cooling is employed to control the temperature within the desired range. The formed alkyl chloride is preferably removed from the reaction mixture to greater or lesser extent by application of sufficient vacuum so the chloride is boiled out. When the boiling points of the formed alkyl chloride and the chloroester reactant are fairly close together, use of a distillation column for removal of the alkyl chloride is advisable for best results. Some of the higher reactants are solids at ordinary temperature, but use of an inert solvent such as xylene enables a fluid reaction system to be realized. The reaction is effected under substantially anhydrous conditions. In order to insure completion of the reaction after addition of the chloroester, the reaction mixture is heated within the indicated temperature range for a reasonable time. The formed phosphate is usually recovered by distillation under sufficiently low pressure that thermal decomposition is avoided. If desired, especially with higher compounds of the invention, crystallization or molecular distillation may be used for recovery of the phosphates.

An alternative, and in many cases more convenient route to the products of the invention is by substituting for Reaction a, the reaction of diketene or substituted diketenes with the alcohols to form the corresponding beta-oxo fatty acid ester, i.e.

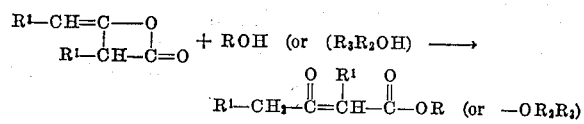

The reaction is catalyzed by acidic or basic catalysts, such as acid or basic resins, tertiary amines, or sulfonic acids. The reaction is conveniently effected by heating a mixture of approximately equimolar portions of the diketene and the alcohol, together with a catalytic amount of the catalyst, to a moderately elevated temperature (100° C. to 150° C. is usually most satisfactory) for a sufficient time to complete the reaction. If a resin is used as catalyst it is then removed by filtration, and the product obtained by distillation of the filtrate. If an amine or sulfonic acid is used as catalyst, it may be removed by neutralization and/or washing the reaction mixture with water, followed by drying of the product and removal of the solvent. This reaction is illustrated by the following example:

EXAMPLE I

*Reaction of an alcohol with diketene*

2-acetoxyethyl acetoacetate is prepared by mixing diketene (42 grams—0.5 mole) and 2-hydroxyethyl acetate (52 grams—0.5 mole) together with 1 gram of a sulfonic acid ion exchange resin (Amberlite IR-120, acid form) and heating carefully at 105 to 130° C. for approximately 1 hour. The resin is removed by filtration. The product then is obtained by fractionating this filtrate in a vacuum. Yield 32.5 grams (35% of theory); B.P. 90-101° C. (approx. 0.1 mm.); $n^{25}$D 1.4390; $d=1.18$.

|  | Analysis of Product | Analysis Calculated for $C_8H_{12}O_5$ |
|---|---|---|
| Carbon, percent w | 52.2 | 51.02 |
| Hydrogen, percent w | 6.2 | 6.38 |

EXAMPLE II 2-(2-acetoxyethoxycarbonyl)-1-methylvinyl dimethyl phosphate is prepared by adding trimethyl phosphite (136.6 grams—1.1 moles) to 2-acetoxyethyl 2-chloroacetoacetate 189 grams—0.85 mole) over a period of 1.5 hours. The reaction is moderately exothermic and the temperature is maintained at 70° C. during the addition by adjusting the rate of addition of the trimethyl phosphite. At the end of the addition the reaction mixture is heated for 2 hours at 120° C. at atmospheric pressure and then for 2 hours at 100° C. at approximately 20 mm. pressure in order to remove the by-product methyl chloride and excess trimethyl phosphite. The product, isolated by distilling in a Claisen apparatus, is obtained as a water white slightly viscous liquid. Yield 190 grams (75.5% of theory). B.P. 155-7° C. (0.08 mm.); $n^{25}D$ 1.4580; $d=1.23$.

|  | Analysis of Product | Analysis Calculated for $PO_8C_{10}H_{17}$ |
|---|---|---|
| Carbon, percent w | 40.6 | 38.6 |
| Hydrogen, percent w | 5.7 | 5.3 |
| Phosphorus, percent w | 10.5 | 10.2 |

EXAMPLE III 2-(2-acetoxyethoxycarbonyl)-1-methylvinyl diethyl phosphate is made by adding triethyl phosphite (33.2 grams—0.20 mole) to 2-acetoxyethyl 2-chloroacetoacetate (44.5 grams—0.20 mole) over a period of ½ hour. The reaction is exothermic and the temperature is maintained at 100° C. by adjusting the rate of addition. At the end of the addition heat is applied to maintain temperature at 100° C. for ½ hour while a vacuum of 130 mm. is maintained to remove the by-product ethyl chloride. The product is isolated by a high vacuum distillation (molecular still) as a water-white slightly viscous liquid. Yield 60 grams (92.5% of theory); B.P. 150° C. (0.001 mm.); $n^{25}$ D 1.4533; $d=1.2$.

|  | Analysis of Product | Analysis Calculated for $PO_8C_{12}H_{21}$ |
|---|---|---|
| Carbon, percent w | 44.7 | 44.5 |
| Hydrogen, percent w | 6.0 | 6.5 |
| Phosphorus, percent w | 10.9 | 9.6 |

EXAMPLE IV 2-(2-(benzoyloxy)ethoxycarbonyl)-1-methylvinyl dimethyl phosphate is made by adding trimethyl phosphite (134 grams—1.08 moles) to 2-benzoyloxyethyl-2-chloroacetoacetate at 90 to 100° C. over a period of ¾ hour. At the end of the addition the reaction mixture is heated at 90 to 100° C. at atmospheric pressure for 1 hour and then at 90 to 95° C. at 150 mm. for an additional ½ hour to remove the by-product methyl chloride. The product is then isolated by fractionation in a high vacuum (molecular still) as a viscous liquid. Yield 273 grams (77.5% of theory); B.P. 160-5° C. (0.001 mm.); $n^{25}$ D 1.5079.

|  | Analysis of Product | Analysis Calculated for $PO_8C_{15}H_{18}$ |
|---|---|---|
| Carbon, percent w | 50.5 | 50.4 |
| Hydrogen, percent w | 5.1 | 5.3 |
| Phosphorus, percent w | 8.7 | 8.66 |

EXAMPLE V 2-(2-methoxyethoxy)carbonyl-1-methylvinyl dimethyl phosphate is prepared by adding trimethyl phosphite (25 grams—0.20 mole) to 2-methoxyethyl 2-chloroacetoacetate (39 grams—0.20 mole) at 85 to 90° C. over ½ hour period. The reaction is mildly exothermic and the temperature is maintained at 85 to 90° C. by adjusting the rate of addition. After completion of the addition heat is applied for 1 hour at 85 to 90° C. at atmospheric pressure and then for ½ hour at 115° C. and 0.1 mm. pressure to remove the by-product methyl chloride. The product is obtained by distilling in a high vacuum (molecular still). Yield 36.5 grams (68% of theory); B.P. 100° C. (0.001 mm.); $n^{25}$ D 1.4537; $d=1.22$.

|  | Analysis of Product | Analysis Calculated for $PO_7C_9H_{17}$ |
|---|---|---|
| Carbon, percent w | 40.9 | 40.3 |
| Hydrogen, percent w | 5.9 | 6.4 |
| Phosphorus, percent w | 10.3 | 11.6 |

EXAMPLE VI

Diethyl 2-(2-methoxyethoxycarbonyl)-1-methylvinyl phosphate is prepared by adding triethyl phosphite (16.6 grams—0.1 mole) to 2-methoxyethyl 2-chloroacetoacetate over a period of ¼ hour. The heat of reaction gives a reaction temperature of 80° C. At the end of the addition, the mixture is heated for 1 hour at 80 to 90° C. and then for 2 hours at 80 to 100° C. and 120 mm. pressure to remove the by-product ethyl chloride. The product is isolated by distilling this crude product in a high vacuum (molecular still). Yield 21.1 grams (71.4% of theory); B.P. 105° C. (0.001 mm.); $n^{25}$ D 1.4497; $d=1.14$.

|  | Analysis of Product | Analysis Calculated for $PO_7C_{11}H_{21}$ |
|---|---|---|
| Carbon, percent w | 44.8 | 44.6 |
| Hydrogen, percent w | 7.3 | 7.1 |
| Phosphorus, percent w | 10.0 | 10.5 |

EXAMPLE VII 2-carbethoxy-1-methylvinyl ethyl 2-methoxyethyl phosphate is prepared by adding diethyl 2-methoxyethyl phosphate (50.3 grams—0.26 mole) to ethyl 2-chloroacetoacetate (42.2 grams—0.26 mole) at 80 to 105° C. over a period of ½ hour. Although the reaction is slightly exothermic, heat is applied during the addition to maintain the reaction temperature. At the end of the addition heating is continued at 105° C. and 25 mm. pressure for ½ hour to remove the by-product ethyl chloride. The product is isolated by fractionation in a high vacuum (molecular still). Yield 50.5 grams (66.5% of theory); B.P. 110° C. (0.001 mm.); $n^{25}$ D 1.4481; $d=1.15$.

|  | Analysis of Product | Analysis Calculated for $PO_7C_{11}H_{21}$ |
|---|---|---|
| Carbon, percent w | 44.8 | 44.5 |
| Hydrogen, percent w | 6.9 | 7.1 |
| Phosphorus, percent w | 10.2 | 10.5 |

EXAMPLE VIII

Bis(2-methoxyethyl) 2-(2-methoxyethoxycarbonyl)-1-methylvinyl phosphate is prepared by adding tris(2-methoxyethyl) phosphite (38.6 grams—0.15 mole) to 2-methoxyethyl 2-chloroacetoacetate (29.2 grams—0.15 mole) at 100° C. over a ¼ hour period. Heat is applied to maintain the reaction temperature at 100° C.

during the addition and for ¾ hour after completion of the addition. The product is isolated by fractionation in a high vacuum (molecular still). Yield 41 grams (76.6% of theory); B.P. 150° C. (0.001 mm.); $n^{25}$ D 1.4535; $d=1.20$.

| | Analysis of Product | Analysis Calculated for PO$_4$C$_{12}$H$_{23}$ |
|---|---|---|
| Carbon, percent w | 42.2 | 43.8 |
| Hydrogen, percent w | 6.2 | 7.0 |
| Phosphorus, percent w | 8.8 | 8.7 |

Other members of the new class of esters are prepared in a similar manner.

Many of the complex esters of the invention are liquids at ordinary temperatures of 20° C. to 25° C. although higher members are crystalline solids at such normal temperatures. The new compounds are very useful substances for a variety of applications but are of particular utility as insecticides because they possess outstanding properties when employed as contact and stomach poisons. The compounds are highly toxic to insects, a term which is employed herein to include not only members of the class Insecta, but also related or similar non-vertebrate animal organisms belonging to the allied classes of arthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or it can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenolethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint.

When employed as an insecticide, a compound of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, azobenzene, and the various compounds of arsenic, lead, and/or fluorine.

The following examples demonstrate the insecticidal qualities of typical compounds of this invention with a comparison being made between the properties of these esters and those of various compounds widely used as insecticides.

EXAMPLE IX

The toxicity of representative products of the invention against the common housefly (*Musca domestica*) was determined using the method described by Y. P. Sun, Journal of Economic Entomology, volume 43, page 45 et seq. (1950). The toxicities were compared to that of alpha-chlordane. The toxicities are expressed in terms of the relationship between the amount of alpha-chlordane required to produce 50% mortality of the test insects and the amount of the test material required to produce the same mortality. Assigning alphachlordane an arbitrary rating of 100%, the toxicity of the test materials is expressed in terms of the toxicity index which compares the activity on a percentage basis with that of the alpha-chlordane. The results are shown in the following table:

Table 1

| Compound | Toxicity Index |
|---|---|
| Alpha-chlordane (Standard for Comparison) | 100 |
| 2-(2-methoxyethoxycarbonyl)-1-methylvinyl dimethyl phosphate | 1040 |
| 2-(2-acetoxyethoxycarbonyl)-1-methylvinyl dimethyl phosphate | 260 |
| 2-(2-acetoxyethoxycarbonyl)-1-methylvinyl diethyl phosphate | 120 |
| 2-(2-(benzoyloxy)ethoxycarbonyl)-1-methylvinyl dimethyl phosphate | 165 |
| 2-carbethoxy-1-methylvinyl ethyl 2-methoxyethyl phosphate | 810 |
| 2-(2-methoxyethoxycarbonyl)-1-methylvinyl diethyl phosphate | 870 |

EXAMPLE X

In further tests, representative compounds of the invention were tested against other common insect pests, comparison being made to common insecticides widely used against such pests. Solutions or emulsions of the representative compounds were made up by employing acetone, or a neutral petroleum distillate lying within the kerosense range as the solvent. These solutions or emulsions were tested for toxicity against (a) the two-spotted spider mite (*Tetranychus bimaculatus*), (b) the pea aphid (*Macrosiphum pisi*), (c) the Mexican bean beetle larva (*Epilachna varivestis*), (d) the southern armyworm (*Prodenia eridania*), (e) the black bean aphid (*Aphis fabae*), (f) the green peach aphid (*Myzus persicae*), (g) the cotton aphid (*Aphis gossypii*) and (h) the hydrangea mite (*Tetranychus hydrangea*), by spraying groups of plants infested with the insects under controlled conditions which varied from test to test only in the identity of the toxic agent and its concentration. These toxicities were compared with the toxicity of (a) parathion, (b) nicotine, (c) the gamma isomer of hexachlorobenzene, (d) DDT, (e) α-chlordane and (f) dieldrin, all insecticides widely used for the destruction of the common insects tested. In each set of tests the conditions were directly comparable—i.e., the same test insect, same plant, environment, etc., were used and the concentration of active material in each case was the same. The toxicities of the test compounds are expressed in terms of a toxicity index, this index being determined as set out in Example VIII. The results of the tests are set out in the following table.

Table II.—Toxicity index (standard=100)

| Test Insect | House Fly | Pea aphid | | Mexican Bean Beetle Larva | Southern Army Worm | | | Two-spotted Spider Mite | Black Bean Aphid | Green Peach Aphid | Cotton Aphid | Hydrangea Mite |
|---|---|---|---|---|---|---|---|---|---|---|---|---|
| Standard | α-chlordane | Nicotine | Parathion | Gamma Benzene Hexachloride | Parathion | DDT | Dieldrin | Parathion | Parathion | Parathion | Parathion | Parathion |
| Compound: | | | | | | | | | | | | |
| A | 1,040 | 6,630 | 180 | 1,800 | 170 | | | 460 | 590 | 135 | 165 | 940 |
| B | 260 | 11,400 | 310 | | 190 | | 125 | 690 | 150 | 180 | 128 | 840 |
| C | 120 | | 142 | 307 | | | | 1,060 | 127 | | | 752 |
| D | 165 | | 200 | | 136 | | | 162 | 196 | | | 237 |
| E | 810 | | | | 110 | 97 | | 530 | | | | |
| F | 810 | | | | 110 | | | 690 | | | | |
| G | | | | 200 | | | | 270 | | | | |

A=2-(2-methoxyethoxycarbonyl)-1-methylvinyl dimethyl phosphate.
B=2-(2-acetoxyethoxycarbonyl)-1-methylvinyl dimethyl phosphate.
C=2-(2-acetoxyethoxycarbonyl)-1-methylvinyl diethyl phosphate.
D=2-[2-(benzoyloxy)ethoxycarbonyl]-1-methylvinyl dimethyl phosphate.
E=2-carbethoxy-1-methylvinyl ethyl 2-methoxyethyl phosphate.
F=2-(2-methoxyethoxy)ethoxycarbonyl-1-methylvinyl diethyl phosphate.
G=Bis-(2-methoxyethyl) 2-(2-methoxyethoxycarbonyl)-1-methylvinyl phosphate.

EXAMPLE XI

Certain representative compounds of the invention were tested to determine their residual toxicity with respect to the adults of several common insects. These tests were performed by spraying the unifested test plants with the test compound as set out in Example IX, and a given number of days thereafter infesting the plants with the test insects. The effectiveness of the test compound is expressed as the percent of the test insects (compared to untreated but equally infested test plants), the count being made 24 hours after the infestation. The details of the tests and the results thereof are summarized in the following tables:

Table III

[Test insect: onion thrips (Thrips tabaci)]

| Concentration of active Material in spray | ⅔ oz./100 gal. | | 3 oz./100 gal. | | 6 oz./100 gal. | |
|---|---|---|---|---|---|---|
| Time (infestation after spraying, days) | 1 | 7 | 1 | 7 | 1 | 7 |
| Compound tested: | | | | | | |
| D (see Table II) | 83 | 52 | 84 | 81 | 93 | 84 |
| Systox (for comparison) | 69 | 42 | 80 | 64 | 90 | 60 |

Table IV

[Test insect: hydrangea mite. Test compound: D (see Table II). Concentration of active material in spray: 4 oz./100 gal.]

| Time (infestation after spraying, days) | 1 | 2 | 7 |
|---|---|---|---|
| Percent control | 100 | 100 | 78 |

Table V

[Test insect: Adult two-spotted spider mite.]

| | Percent control | | | |
|---|---|---|---|---|
| Concentration of active material in spray | 1.0% w. | | 0.25% w. | |
| Time (infestation after spraying, days) | 1 | 7 | 1 | 7 |
| Compound: | | | | |
| C (see Table II) | 100 | 100 | 99 | 51 |
| D (see Table II) | 100 | 100 | 100 | 100 |
| Parathion (for comparison) | 99 | 62 | 97 | 36 |

Table VI

[Test insect: Mexican bean beetle larva. Time of infestation: 7 days after spraying. (The concentration of test compound in the spray is given in parentheses following the percent kill, in the table.)]

| | Percent kill | |
|---|---|---|
| Condition | In shade | In sun |
| Compound: | | |
| A | 73 (0.02% w.) | 23 (0.02% w.) |
| B | 83 (0.02% w.) | 71 (0.02% w.) |
| D | 97 (0.02% w.) | 77 (0.02% w.) |
| Parathion (for comparison) | 50 (0.05% w.) | 2 (0.05% w.) |

EXAMPLE XII

Tests were also made on certain of the compounds of the invention, Parathion, Systox and dimethyl 1-carbomethoxy-1-propen-2-yl phosphate, another known insecticide under conditions such that the residual toxicity of the compounds toward the eggs, the young hatched from the eggs, as well as the adults of two-spotted spider mites, would be measured. The time of infestation was 7 days after spraying. The results are shown in the following table. (In the table, the concentration of the test compound in the spray is given in parentheses following the percent kill.)

Table VII

| | Percent kill | | |
|---|---|---|---|
| Compound: | | | |
| A | 78 (0.03% w.) | 82 (0.06% w.) | 93 (0.12% w.) |
| B | 91 (0.025% w.) | 94 (0.05% w.) | 100 (0.1% w.) |
| C | | 76 (0.03% w.) | 88 (0.06% w.) |
| D | 100 (0.1% w.) | 100 (0.2% w.) | 100 (0.4% w.) |
| Parathion | 50 (0.15% w.) | 70 (0.3% w.) | 88 (0.6% w.) |
| Systox | 83 (0.06% w.) | 86 (0.12% w.) | 98 (0.24% w.) |
| Dimethyl 1-carbomethoxy-1-propen-2-yl phosphate | | 59 (0.09% w.) | 78 (0.18% w.) |

EXAMPLE XIII

A representative member of the new class of insecticides also as tested under conditions such that the residual toxicity thereof would be determined. For comparison, Systox, Parathion, and dimethyl 1-carbomethoxy-1-propen-2-yl phosphate, were tested under the same conditions.

The tests were conducted against leafhoppers (*Erythroneura comes*) on grapes. Iindividual grape canes were sprayed to run-off with 3 ounces actual toxicant per 100 gallons of water. The sprays were then repeated two more times. Twenty-five adult leafhoppers were caged on each cane at intervals after each spray and counts were made 24 hours later. A summary of the results obtained are given in Table VIII.

Table VIII

| Time (days following injestation after spraying) | Percent control (average) | | | |
|---|---|---|---|---|
| | 1 | 7 | 14 | 22 |
| Compound: B (see Table II) | 87 | 76 | 60 | 35 |
| Systox | 64 | 65 | 28 | |
| Parathion | 68 | 9 | 4 | |
| Dimethyl 1-carbomethoxy-1-propen-2-yl phosphate | 92 | 2 | 3 | |

We claim as our invention:

1. 2 - (2 - acetoxyethoxycarbonyl) - 1 - methylvinyl dimethyl phosphate.
2. 2 - (2 - acetoxyethoxycarbonyl) - 1 - methylvinyl diethyl phosphate.
3. 2 - [2-(benzoyloxy)ethoxycarbonyl]-1-methylvinyl dimethyl phosphate.
4. 2 - (2 - methoxyethoxycarbonyl) - 1 - methylvinyl dimethyl phosphate.
5. 2 - (2 - methoxyethoxycarbonyl) - 1 - methylvinyl diethyl phosphate.
6. 2 - carbethoxy - 1 - methylvinyl ethyl 2 - methoxyethyl phosphate.
7. A compound of the formula

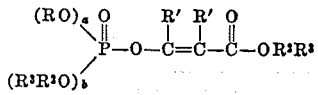

wherein R' represents a member of the group consisting of hydrogen and alkyl radicals of 1 to 8 carbon atoms, R represents an alkyl radical of 1 to 8 carbon atoms, $R^2$ represents an alkylene group of not more than 10 carbon atoms, $R^3$ represents a functional group involving oxygen of not more than 10 carbon atoms selected from the group consisting of —$OR^4$ and

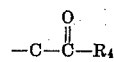

wherein $R^4$ is an alkyl radical, and $a$ represents an interger selected from the group consisting of 0, 1 and 2 with the provision that $a+b=2$.

8. A compound of the formula

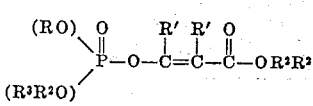

wherein R' represents a member of the group consisting of hydrogen and alkyl radicals of 1 to 8 carbon atoms, R represents an alkyl radical of 1 to 8 carbon atoms, $R^2$ represents an alkylene group of not more than 10 carbon atoms, and $R^3$ represents a functional group involving oxygen of not more than 10 carbon atoms selected from the group consisting of —$OR^4$ and

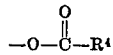

wherein $R^4$ is an alkyl radical.

9. A compound of the formula

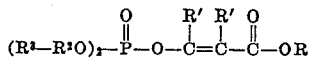

wherein R' represents a member of the group consisting of hydrogen and alkyl groups of 1 to 8 carbon atoms, R represents an alkyl radical of 1 to 8 carbon atoms, $R^2$ represents an alkylene group of not more than 10 carbon atoms, $R^3$ represents a functional group involving oxygen of not more than 10 carbon atoms selected from the group consisting of —$OR^4$ and

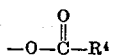

wherein $R^4$ is an alkyl radical.

10. A compound of the formula

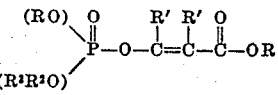

wherein R' represents a member of the group consisting of hydrogen and alkyl radicals of 1 to 8 carbon atoms, R represents an alkyl radical of 1 to 8 carbon atoms, $R^2$ represents an alkylene group of not more than 10 carbon atoms, and $R^3$ represents a functional group involving oxygen of not more than 10 carbon atoms selected from the group consisting of —$OR^4$ and

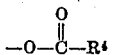

wherein $R^4$ is an alkyl radical.

11. A compound of the formula

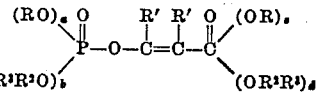

wherein R' represents a member of the group consisting of hydrogen and alkyl radicals to 1 to 8 carbon atoms, R represents an alkyl radical of 1 to 8 carbon atoms, $R^2$ represents an alkylene group of not more than 10 carbon atoms, $R^3$ represents a functional group involving oxygen having not more than 10 carbon atoms selected from the group consisting of —$OR^4$ and

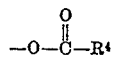

wherein $R^4$ is an alkyl radical, $a$ represents an integer selected from the group consisting of 0, 1 and 2, with the provision that $a+b=2$, and $c$ is an integer selected from the group consisting of 0 and 1, with the provision that $c+d=1$, and with the further provision that $b+d=$at least 1.

References Cited in the file of this patent

UNITED STATES PATENTS

| 2,685,552 | Stiles | Aug. 3, 1954 |
| 2,802,856 | Norman et al. | Aug. 13, 1957 |